United States Patent [19]

Block

[11] Patent Number: 4,473,479

[45] Date of Patent: * Sep. 25, 1984

[54] VISCOSIFIER AND FLUID LOSS CONTROL SYSTEM

[75] Inventor: Jacob Block, Rockville, Md.

[73] Assignee: W. R. Grace & Co., New York, N.Y.

[*] Notice: The portion of the term of this patent subsequent to Apr. 3, 2001 has been disclaimed.

[21] Appl. No.: 446,997

[22] Filed: Dec. 6, 1982

Related U.S. Application Data

[63] Continuation-in-part of Ser. No. 239,072, Feb. 27, 1981, Pat. No. 4,366,070, which is a continuation-in-part of Ser. No. 144,366, Apr. 28, 1980, abandoned.

[51] Int. Cl.$^3$ ................................................ C09K 7/02
[52] U.S. Cl. .............................. 252/8.5 A; 252/8.5 P
[58] Field of Search .............. 252/8.5 A, 8.5 B, 8.5 C, 252/8.5 P, 8.55 R

[56] References Cited

U.S. PATENT DOCUMENTS

| | | | |
|---|---|---|---|
| 3,072,635 | 1/1963 | Menkart et al. | 536/87 X |
| 3,847,638 | 11/1974 | Suman et al. | 252/8.55 X |
| 3,852,201 | 12/1974 | Jackson | 252/8.5 |
| 3,860,070 | 1/1975 | Herce et al. | 166/283 X |
| 3,900,406 | 8/1975 | Clampitt et al. | 252/8.5 X |
| 4,045,357 | 8/1977 | Reed | 252/8.5 |
| 4,240,915 | 12/1980 | Block | 252/8.5 |
| 4,366,070 | 12/1982 | Block | 252/8.5 |

Primary Examiner—Herbert B. Guynn
Attorney, Agent, or Firm—Howard J. Troffkin

[57] ABSTRACT

A composition capable of imparting a combination of pseudoplasticity and fluid loss control properties to aqueous systems. The composition is an admixture of:
(a) a hydroxy containing aluminum component and
(b) a cross-linked hydroxyalkyl cellulose reaction product; wherein the amount of component (a) to component (b) is in the weight ratio capable of directly forming an aqueous system having from about 0.5 to 10 weight percent of component (a) and from about 0.3 to 5 weight percent of component (b) based on the weight of the water of the system.

The invention is further directed to improved drilling fluids containing said composition and to the process of drilling bore holes using said improved fluid.

30 Claims, No Drawings

VISCOSIFIER AND FLUID LOSS CONTROL SYSTEM

This application is a continuation-in-part application of U.S. application Ser. No. 239,072, filed Feb. 27, 1981, now U.S. Pat. No. 4,366,070 which, in turn, is a continuation-in-part application of U.S. application Ser. No. 144,366, filed Apr. 28, 1980, which is now abandoned.

BACKGROUND OF THE INVENTION

The present invention relates to a composition which is capable of imparting non-Newtonian, pseudoplasticity and fluid loss controlling properties to aqueous systems. More particularly, the present invention relates to the formation of an improved water-based, clay-free drilling fluid containing the subject composition and to an improved method of drilling bore holes into subterranean formations using said drilling fluid.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well wall. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high shear conditions which are present in the environs of the drill bit while, at the same time, being capable of having and maintaining sufficient viscosity to be capable of efficiently carrying the bit cuttings to the surface and maintaining in suspension, any other solid components of the drilling fluid.

A typical fluid composition contains various agents to impart needed properties to the fluid at different stages in the drilling operation. The drilling fluid must also be capable of inhibiting the amount of fluid, normally water, which is lost into the porous strata through which the bore hole traverses. The loss of fluid causes the formation and build-up of a cake deposit which, after a period of time, can cause sticking of the drill pipe and stoppage of the drilling operation. The drilling fluid must, therefore, be of a nature which permits minimum loss into the porous strata. Agents which impart such property are conventionally termed "water loss controllers" or "fluid loss controllers".

The drilling fluid must also be capable of exhibiting the above-described fluid-loss and pseudoplastic properties under changing composition and environmental conditions encountered during the drilling operation due to the fact that the bore hole traverses various strata such as shales, clay, etc., and the cuttings of these materials become dispersed in the fluid media. The drilling fluid components should be substantially stable to the presence of various calcium compounds and to sodium chloride which may be present in the fluid from the soil strata with which it is in contact and/or due to the use of salt water having calcium or sodium salts therein used in forming the drilling fluid.

It is desired that the drilling fluid components should be stable and functional at elevated temperature. It is well known that as the bore hole increases in depth the temperatures encountered are substantially above that found at the earth's surface. Further, heat is generated by frictional forces on the drill bit. It is, therefore, desired that components used in forming drilling fluids be stable with respect to varying elevated temperature conditions.

A wide variety of drilling fluids have been used, including aqueous-based liquids, hydrocarbon based liquids, air and other gases, mist, foams and the like. Since great volumes of drilling fluids are required for the purposes of providing a cooling medium for the rotary bit and a means of carrying off the drilled particles, most of the conventional fluids used have been based on water. Water alone being a Newtonian fluid, does not have the needed capability to efficiently carry the drilled particles from the bore hole to the surface nor the capacity of inhibiting loss of fluid into adjacent porous strata.

It is a widely held and accepted theory that the viscosities suitable for creating a particle carrying capacity in the fluid can be achieved with the drilling fluid having pseudoplastic properties. For example, the drilling fluid must be capable of having a low viscosity under the high shear rates such as encountered at the drill bit, yet have the ability to increase in viscosity (and, therefore, particle holding power) under decreasing shear rates encountered in its upward movement through the annulus.

In order to obtain the requisite pseudoplastic properties, it has been thought desirable to use clay or colloidal clay bodies such as sodium bentonite. As a result, the drilling fluids have been usually referred to as "muds". The use of clay based drilling fluids has provided the means of initially meeting the two basic requirements of drilling fluids, i.e., cooling and particle removal. However, the clay-based drilling fluids are highly unstable when they come in contact with various salts found in drilled earth formations.

Materials which have come into expanding use to impart rheological properties to drilling compositions are xanthan gums such as are described in U.S. Pat. Nos. 3,198,268; 3,208,526; 3,251,147; 3,243,000; 3,307,016; 3,319,715 and 3,988,246. These materials have been found to cause aqueous solutions, such as drilling fluids, to exhibit pseudoplastic properties under varying low shear rates. However, these materials, whether used alone or in combination with other additives, present the problem of being irreversibly degraded by the elevated temperatures often encountered during conventional drilling operations and thereby require continuous supplementation of material. The high cost of the xanthan gums, and the high rate of degradation, limit their usefulness to specialized operations.

Prior utilization of hydroxides or hydrated metal oxides of amphoteric metals in well treating fluids have involved properties distinctly different from the properties required for a drilling fluid as described herein. For example, U.S. Pat. Nos. 3,614,985 and 3,815,681 describe a process for plugging a subterranean reservoir by permeating its pores with a solution containing an amphoteric metal salt and a pH increasing reactant to cause precipitation in the pores. U.S. Pat. No. 3,603,399 describes a process for treating a water sensitive formation by permeating its pores with a hydroxy-aluminum solution which is a clear and relatively non-viscous solution. In each of such prior well treating processes, it has been important that the solution have relatively low viscosity and high fluid loss to ensure that the solution penetrates into the matrix or pores of the reservoir. In contrast, in a drilling fluid, it is important that the fluid be capable of having a high viscosity over the major region of its use (the annular region of the drill stem), exhibit a low viscosity at the drill bit site and be capable of not penetrating the formation and thereby leaving a filter cake over the entire bore hole. U.S. Pat. No. 3,860,070 describes a well completion or fracturing fluid containing an amphoteric metal salt and a base in a ratio to make the final solution strongly acidic in order to form a thickened fluid suitable as a fracturing fluid. Such fluids can not be used satisfactorily in a drilling operation due to their corrosive nature with respect to the metal drilling equipment. None of the various well treating fluids described in the above references would be suitable for their intended purpose if they contained a fluid loss agent.

The viscosity of a drilling fluid has been relied upon as a mode of aiding in fluid loss control with little success especially when drilling into and through porous substrates. To enhance the control, various agents have been added. For example, in U.S. Pat. Nos. 3,032,498 a cyanoethylated starch was described as a water loss controller when used in combination with a clay-based mud. U.S. Pat. No. 3,988,246 describes an esterified or etherified starch as a water loss controlling agent which is compatible with a xanthan gum based drilling mud. Other starches have been employed in clay free muds under limiting temperature conditions as starches are known to be temperature sensitive.

There is a general need for a composition which is capable of imparting both pseudoplastic and water loss controlling properties to aqueous compositions such as drilling fluid compositions. The composition should be stable to varying conditions and temperatures commonly encountered in drilling operations and must be easily produced at low cost to aid in the economics of drilling operations.

SUMMARY OF THE INVENTION

The present invention is directed to a composition capable of imparting both pseudoplasticity and fluid loss control to alkaline aqueous systems. The composition is a combination of:

(a) a hydroxy containing aluminum agent formed by mixing in an aqueous solution and under a high degree of agitation a water soluble basic agent selected from an alkali metal aluminate, alkali metal hydroxide or ammonium hydroxide with a water soluble acidic agent selected from an inorganic acid, or aluminum chloride, sulfate or nitrate such that at least one of said agents is an aluminum containing compound; and (b) a reaction product formed between a hydroxyalkyl cellulose and a cross-linking agent, the cross-linking agent present at a concentration equivalent to at least about 0.1 percent of stoichiometry with respect to the hydroxyl groups present in the hydroxyalkyl cellulose.

The subject combination imparts pseudoplasticity and fluid loss controlling properties to an aqueous system which are unattributable to each of the components and which are stable to elevated temperature and conditions commonly encountered in bore hole drilling operations.

DETAILED DESCRIPTION OF THE INVENTION

The present invention is directed to a composition which is capable of imparting a high degree of pseudoplastic and fluid (commonly, water) loss controlling properties to aqueous systems; to the use of such compositions to form an improved water-based, clay-free drilling fluid; and to drilling of bore holes into subterranean formations using said improved drilling fluid.

The subject composition is a combination of a hydroxy containing aluminum agent and a cross-linked hydroxyalkyl cellulose reaction product. The subject composition shall be described in terms of its use as a component of a drilling fluid.

The hydroxy containing aluminum agents found useful as a component of the composition of the present invention are agents which are substantially water-insoluble, that is, agents which are in suspension or dispersion in aqueous systems. Further, the subject hydroxy containing aluminum agents can be characterized as having an x-ray diffraction spectrum containing a major characterizing diffraction peak at 6.3±0.2 Angstroms or characterized by an x-ray diffraction spectrum as being amorphous, that is, having substantially no x-ray diffraction pattern within the range of from 1.5 to 17 Angstroms. The spectrum is determined by standard techniques using the K-α doublet of copper as the radiation source.

The subject hydroxy containing aluminum agent of the subject invention is formed by contacting certain acidic agents with certain basic agents, as described below, in an aqueous medium under a high degree of agitation. The acidic and basic agents should be used in a ratio such that the resultant product is capable of imparting a pH of at least 8 and preferably from 8 to 10.3 to the water medium in which it is formed.

The basic agents useful in forming the hydroxy-containing aluminum component are water soluble basic materials selected from an alkali metal aluminate, alkali metal hydroxide or ammonium hydroxide or mixtures thereof. Any alkali metal can be used, such as sodium, potassium and the like, with sodium being preferred.

The acidic agent useful in forming the hydroxy-containing aluminum component are water soluble acidic materials selected from an inorganic acid as, for example, hydrochloric, sulfuric or nitric acid and the like, or an aluminum salt selected from aluminum chloride, aluminum nitrate or aluminum sulfate, their hydrates or mixtures of these acidic agents. At least one and preferably both of the acidic and basic agents must be an aluminum containing agent. For example, the hydroxy containing aluminum component may be formed from an alkali metal aluminate, such as sodium aluminate, and aluminum chloride hexahydrate in an aqueous system. The sodium aluminate is mixed with the aluminum chloride hexahydrates in an aqueous phase under high speed mixing. The aluminates which are useful normally will have an alkali metal oxide to aluminum oxide mole ratio of from about 1:1 to 2:1. These materials are commercially available. If desired, solutions of one or both components can be made and then mixed together under high speed mixing to form the hydroxy containing aluminum agent.

The acidic and basic precursor agents can be present in concentrations of from about 5 to 25 percent by weight based on the water present. The concentration can vary above the upper value indicated but should not be such as to inhibit the thorough mixing, preferably under high speed agitation, of the agents during the formation of hydroxy-containing aluminum component. The acidic and basic agents can be mixed using conventional equipment which can generate a high degree of agitation to the aqueous medium. The ratio of acidic and basic component should be such that a final pH of the aqueous medium is at least 8, is preferably from 8 to about 10.3 and more preferably from about 8.3 to 9.7. The resultant aluminum component has hydroxyl groups as an integral part of its composition.

The hydroxyalkyl cellulose reaction product found useful in forming the subject inventive composition is formed by contacting a hydroxyalkyl cellulose with a cross-linking agent as described below. The hydroxyalkyl cellulose can have a $C_1$–$C_3$ alkyl group and, therefore, be hydroxymethyl, hydroxyethyl, hydroxy-n-propyl or hydroxyisopropyl cellulose. These materials are commercially available. The preferred material is hydroxyethyl cellulose. It is well known that unmodified cellulose chains are composed of repeating anhydroglucose rings, each of which has three hydroxy groups. To form hydroxyethyl cellulose, for example, the cellulose is conventionally treated with an alkali hydroxide and then reacted with ethylene oxide by known manners. The hydroxyalkyl cellulose can have a weight average molecular weight of at least about 20,000 and preferably at least 60,000 with from 60,000 to 150,000 being most preferred.

The cross-linked hydroxyalkyl cellulose suitable in the present invention can be formed by reacting hydroxyalkyl cellulose with a cross-linking agent selected from an aldehyde or aldehyde generating agent or an epihalohydrin. Suitable aldehyde containing reactants are known organic compounds which contain at least one aldehyde group therein capable of reacting with hydroxy groups which include, for example, formaldehyde, acetaldehyde, propionaldehyde, glycolaldehyde, glycoxylic acid and the like or polyaldehydes i.e. known organic compounds having more than one aldehyde group therein, such as glyoxal, paraformaldehyde and the like. Preferred aldehyde reactants are formaldehyde and paraformaldehyde. Aldehyde generating agents are agents capable of generating an aldehyde moiety in the reaction medium and include, for example, melamine-formaldehyde monomeric products and derivatives such as tri and hexa(methylol)melamine and the tri and hexa($C_1$–$C_3$ alkoxymethyl)melamine. Such materials can be formed by known conventional methods. The alkyl blocked derivatives are commercially available, are stable to self polymerization and are, therefore, preferred.

The cross-linking agent found suitable in forming the subject cross-linked hydroxyalkyl cellulose component can be an epihalohydrin. The halo group can be chlorine, bromine and the like with chlorine being preferred. Further, the epihalohydrin can be substituted with a $C_1$–$C_3$ alkyl group such as methyl, ethyl, or propyl. The most preferred epihalohydrin cross-linking agent is epichlorohydrin due to its availability and superior product formed.

The subject cross-linked hydroxyalkyl cellulose can be formed by reacting a hydroxyalkyl cellulose, as described above, with from about 0.1 to 200 and preferably from about 1 to 200 and most preferably 2 to 50 percent of stoichiometry of a cross-linking reactant. Stoichiometry is based on all available hydroxyl groups on the hydroxyalkyl cellulose. Smaller amounts, such as 0.1 percent or less, of the cross-linking reactant may be used. The exact amount required depends on the particular materials used and can readily be determined for a particular reactant and hydroxyalkyl cellulose in known manners by those skilled in the art. The formed substantially uniformly cross-linked product should not be substantially water soluble but, instead, should be capable of forming small, discrete, swollen gas particles when introduced into aqueous systems.

The formation of the cross-linked hydroxyalkyl cellulose with an aldehyde is carried out in an aqueous acidic medium which has a pH of 5.5 or less and preferably from 1 to 4.5. The reaction can be carried out at ambient or elevated temperatures, such as from about 50° C. to 100° C. The solid product can be recovered by conventional techniques of precipitation by salts or alcohol, filtration and drying.

The formation of the cross-linked hydroxyalkyl cellulose with an epihalohydrin should be carried out in a basic aqueous medium which has a pH of at least about 9.5. The reaction can be carried out at ambient or elevated temperatures, such as from about 50° C. to 100° C. The product is recovered by conventional techniques of precipitation by salts of alcohol, filtration and drying.

Compositions having the combination of the subject hydroxy-containing aluminum agent and the cross-linked hydroxyalkyl cellulose reaction product have unexpectedly been found to exhibit the desired combination of properties of pseudoplasticity and fluid-loss control which are unattainable by separate use of the materials.

Amphoteric metal hydroxides formed in various manners and from various material are known to form a gelatinous mass in aqueous systems. Aqueous amphoteric metal hydroxide gels have been found useful for various purposes, such as coatings, adhesives and the like as well as in specific well treating compositions, such as fracturing or completion fluids. Such gels and compositions are used under conditions distinctly different than presently required and do not exhibit water-loss controlling properties. Although hydroxy-containing aluminum agents disclosed herein have been unexpectedly found capable, when used alone, of imparting a certain degree of pseudoplasticity to aqueous systems, they do not impart fluid loss control to aqueous systems.

The presently described cross-linked hydroxyalkyl cellulose reaction products do not, when used alone, exhibit and impart fluid loss control or pseudoplasticity as described herein above to aqueous systems such as water-based clay-free drilling fluids. Further, hydroxyalkyl cellulose which is not cross-linked in the manner described above does not impart the combination of fluid loss control and pseudoplasticity to aqueous systems when used alone or with the subject hydroxy containing aluminum compound.

It has been presently unexpectedly found that when the cross-linked hydroxyalkyl cellulose reaction product is combined with the hydroxy-containing aluminum agent one unexpectedly attains equal or superior pseudoplastic properties and an exceptionally high degree of fluid loss control not attributable to either component. Further, uniqueness of the subject composition is shown by the fact that other trivalent metal hydroxides and the subject cross-linked cellulose material do not exhibit the desired properties.

The aqueous system which contains the subject composition should have an alkaline pH of at least 8 and preferably from 8 to 12 and more preferably of from 8.3 to 10.3. At these alkaline pH conditions, one attains the desired properties. Adjustment of the pH can be done with any water soluble inorganic base or acid such as alkali metal hydroxide, alkaline earth metal hydroxide or a hydrohalic acid, sulfuric acid, nitric acid, sodium bicarbonate, or sodium carbonate.

The aqueous system should be mixed to the extent required to cause the components of the composition to be substantially uniformly distributed therein. Further, the hydroxy aluminum containing aqueous medium or preferably the resultant composition containing system may have the combined described properties further enhanced by subjecting the system to mixing at high shear rates of about 20,000 sec.$^{-1}$ or greater for short periods of time such as from 5 to 60 minutes as by circulating the aqueous system through a small internal diameter tube at high rate.

The aqueous medium in which the above-described hydroxy-containing aluminum agent is formed can be directly used to form the water-based drilling fluids of the subject invention. The aqueous medium can be diluted with a sufficient amount of water to form a system having from 0.5 to 10 percent, and preferably from 1.5 to 3.5 percent, by weight based on the weight of the water of the resultant hydroxy aluminum compound assuming a molecular formula of AlO(OH) for the hydroxy aluminum compound. The concentration most suitable can be readily determined in conventional manners by the mud engineer taking into consideration the concentration and nature of other materials which may also be contained in the drilling fluid.

The cross-linked hydroxyalkyl cellulose reaction product can be used in any effective amount which, when combined with the amount of aluminum component present, imparts fluid loss control to the resultant aqueous system. Normally the concentration should be from 0.3 to 5 percent and preferably from 0.75 to 2 percent cross-linked hydroxyalkyl cellulose reaction product based on the weight of the water of the resultant aqueous system. The concentration most suitable can be readily determined in conventional manners taking into consideration the nature of the cellulosic polymer i.e. molecular weight, hydroxyl content, the cross-linking reactant, etc., as well as the nature and concentration of other materials contained in the aqueous system.

The above-described composition is capable of imparting to a clay-free, (the term "clay-free" when used herein refers to the absence of drilling fluid viscosifying clays as an essential agent of the fluid and not to other materials entrained therein) aqueous system, such as a water-based drilling fluid (the term "fluid" or "system" when used herein refers to water-based systems containing the subject composition) non-Newtonian, pseudoplasticity, that is to say, that the viscosity of the resultant fluid varies inversely with respect to the shear rate exerted on the fluid. The relationship of the shear stress with respect to shear rate can be defined by the rheological power law model relationship of $$\tau = K(\gamma)^n$$

in which $\tau$ represents the shear stress exerted on the aqueous system of the drilling fluid in units such as pounds per 100 ft$^2$ or dynes/cm$^2$; $\gamma$ is the shear rate in units of reciprocal time such as sec$^{-1}$; K is a constant having the value of the shear stress of the particular aqueous system at a shear rate of 1 sec$^{-1}$; and n ia a numerical value greater than zero. When n=1, the system is Newtonian; if n is less than 1, the system is pseudoplastic, and if n is greater than 1, the system is dilatant. It has been unexpectedly found that fluids containing the presently described composition exhibit shear stress ($\tau$) properties at varying shear rates ($\gamma$) in the range of from about 10 to 400 sec$^{-1}$, that is, in the range normally encountered in the annular region of the bore hole such that n of the power law relationship has a value of less than about 0.4. Such systems, therefore, exhibit non-Newtonian, pseudoplastic properties to an exceptionally high and desirable degree.

The above-described composition has been unexpectedly found to exhibit a high degree of fluid loss control. That is to say that the fluid is capable of interacting with the adjacent porosity to inhibit loss of the fluid to the porous environment. The fluid loss of the system can be determined in accordance with the American Petroleum Institute's procedure API No RP-13B. After initial spurt, the desired water loss control attained with the subject composition is of less than about 40 ml per 30 minutes and, preferably, less than about 20 ml/30 min.

It has been further unexpectedly found that the subject composition has excellent stability to temperature, calcium and sodium salts and various other conditions desired of a fluid used in rotary drilling of bore holes and the like. The drilling fluids containing the subject composition have unexpectedly been found to have high degrees of stability with respect to their rheological and fluid loss properties under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The high degree and breadth of stability of the presently achieved drilling fluid, when combined with its ability to exhibit non-Newtonian, pseudoplastic properties under varying low shear rates of from about 10 to 400 sec$^{-1}$ and greater, such as are encountered in the annular region between the drill stem and the casing of the bore hole, aids in increasing the drilling efficiency, that is, the rate of drilling the bore hole.

The drilling fluid composition of the subject invention can contain other conventional drilling fluid additives such as weighting agents as, for example, crushed oyster shells, barite and the like; thinner such as ferrochrome lignosulfonate and the like; lost-circulation agents such as ground walnut shells, cotton seed hulls and the like; pH adjusters such as MgO, sodium carbonate, sodium bicarbonate and the like; as well as other conventional additives.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation which has been drilled into or, under certain conditions, can be purposely added.

The present water-based, clay-free drilling fluids containing the subject composition described above and having a pH within the range of from about 8 to 12, and preferably 8.3 to 10.3 have been found to be stable to temperature, the presence of calcium and sodium salts and to the presence of conventional drilling fluid additives. Other viscosifiers and water loss controllers need not be present. Further, the present drilling fluids are substantially non-corrosive and non-destructive to metal equipment commonly used in drilling operations.

The subject composition can be used with conventional bore hole drilling equipment in manners known to those skilled in the art to efficiently and effectively drill bore holes into subterranean formations. The pseudoplastic and fluid loss control properties of drilling fluids containing said composition permit effective removal of the cuttings from the area at and around the drill bit to permit more efficient drilling of the formation when circulating the fluid during bore hole drilling.

The following examples are given for illustrative purposes only, and are not meant to be a limitation on the subject invention except as indicated by the appended claims. All parts and percentages are by weight unless otherwise indicated. The units of K of the power law is lb-sec/100 ft$^2$.

EXAMPLE I

Formation of Cross-Linked Hydroxyethyl Cellulose

A. A 40 percent aqueous solution of glyoxal was added with stirring to a 5 percent solution of a commercially obtained hydroxyethyl cellulose (MS equals 2.5; Brookfield viscosity of a 5 percent aqueous solution equals 150 centapoise) (Natrosol 250L). The weight ratio of glyoxal to hydroxyethyl cellulose was 21 to 100. The pH of the aqueous system was adjusted to 3.5 with 1N HCl and the system was heated to 60°–70° C. for 30 minutes with stirring. The resultant aqueous suspension of cross-linked hydroxyethyl cellulose was adjusted to pH 9.5 with 10 percent NaOH solution.

B. A cross-linked hydroxyethyl cellulose was made in the same manner as in Part A above, except that paraformaldehyde was used instead of glyoxal. The weight ratio of paraformaldehyde to HEC was 13.5 to 100.

C. A cross-linked hydroxyethyl cellulose was prepared by adding 5.1 parts epichlorohydrin and 4.4 parts sodium hydroxide to 200 parts of a 5 percent aqueous solution of hydroxyethyl cellulose, as described above. The solution was heated to 80° C. and maintained at that temperature for 1 hour under continuous agitation. The material was cooled to form the aqueous suspension of cross-linked hydroxyethyl cellulose.

EXAMPLE II

Formation of Hydroxy-Containing Aluminum Agent 15.3 parts of commercially obtained sodium aluminate (Na$_2$O Al$_2$O$_3$ 3H$_2$O) powder was mixed with 12.2 parts of commercially obtained aluminum chloride hexahydrate powder. The mixture was added to 350 parts water and subjected to high speed mixing using a Hamilton Beach Model 936-2 mixer for 20 minutes. The aqueous dispersion was allowed to sit for 18 hours and then again subjected to high speed mixing for 5 minutes. The pH of the resultant dispersion was 8.5 and was adjusted to 9.6 with dilute NaOH.

The hydroxy-containing aluminum agent concentrations will be determined herein below based on the formula AlO(OH) although the subject agent may be present in other forms.

EXAMPLE III

For comparative purposes, aqueous samples of hydroxy-containing aluminum and of cross-linked hydroxyethyl cellulose reaction products, respectively, were tested for rheology and fluid loss control.

An aqueous system having 3 percent of the hydroxy-containing aluminum product prepared according to Example II above and having a pH of 9.6 was subjected to rheological analysis using standard procedures with a Haake Rotovisco RV-1 rotating rheometer at varying shear rates of from 8 to 800 sec$^{-1}$ and at 25° C. The values determined for n and K in accordance with the power law model relationship was 0.19 and 2.3, respectively. The fluid loss control of the material was determined using American Petroleum Institute (API) procedure RP 13B at 100 psi and 25° C. A fluid loss value of greater than 150 ml/30 minutes was obtained. The product imparted good pseudoplasticity but substantially no fluid loss control.

The cross-linked hydroxyethyl cellulose product of Example I C was diluted with water to form aqueous systems having 1 percent cross-linked hydroxyethyl cellulose therein. The rheology and fluid loss control properties were determined in the same manner and procedures described herein above with respect to the hydroxy-containing aluminum compound. The material was found to be substantially Newtonian (n=1, K≦0.1), and to have a fluid loss of greater than 100 ml/30 minutes. The cross-linked HEC reaction products do not impart pseudoplasticity nor fluid loss control to aqueous systems.

EXAMPLE IV

This example illustrates that aqueous systems containing a mixture of the hydroxy-containing aluminum compound and the cross-linked hydroxyethyl cellulose reaction product exhibit a combination of good pseudoplasticity and good fluid loss control and are stable even when subjected to elevated temperatures for sustained periods of time.

Four parts of the hydroxy-containing aluminum product prepared in the manner described in Example II was mixed with 1 part of the glyoxal cross-linked hydroxyethyl cellulose (GL-HEC) product prepared in the manner described in Example I(A). The resultant aqueous composition contained a uniform mixture of 2.4 percent hydroxy-containing aluminum product [symbolized as AlO(OH)] and 1 percent GL-HEC product. A sample (Sample 1) was taken of the composition to determine its rheology and fluid loss control at 25° C. by the methods described in Example III. A second sample (Sample 2) of the composition was placed in a vessel under a N$_2$ atmosphere, sealed and subject to 121° C. (250° F.) for 16 hours while under constant agitation and then allowed to cool to room temperature. The rheology and fluid loss control of the heat treated composition were determined by the above referenced procedure. Finally, a third sample (Sample 3) of the composition was subjected to elevated temperature (250° F./16 hours) and was then subjected to high shear forces by circulating the sample composition through a capillary tube (I.D.=0.0314 inch) for 30 minutes to give an approximate calculated shear rate of 25,000 sec$^{-1}$. The rheology and fluid loss control of this sample were determined. A summary of the results are contained in Table I below.

The fluid loss determined according to API procedure RP 13B yields a total fluid loss (TFL) in ml/30 minutes) which is the cumulative value of the spurt (Sp in ml) and the corrected fluid loss (CFL in ml/30 min). The spurt is obtained by plotting cumulative volume on the ordinate and the square root of time on the abscissa and then extrapolating the straight line back to the ordinate. The intercept is the value of the spurt volume. The corrected fluid loss is obtained by subtracting the spurt value from the total fluid loss volume. The corrected fluid loss value is the rate of loss the fluid would be expected to exhibit over an extended period.

TABLE I

Rheology and Fluid Loss Control
Hydroxy Aluminum - (GLY/HEC) Composition

| Sample No. | GLY/HEC (%) | AlOOH (%) | n | K | TFL | Sp | CFL |
|---|---|---|---|---|---|---|---|
| 1 | 1 | 2.4 | 0.21 | 5.6 | 26.4 | 6.0 | 20.4 |
| 2 | 1 | 2.4 | 0.22 | 20.0 | 41.0 | 10.0 | 31.0 |
| 3 | 1 | 2.4 | 0.17 | 29.0 | 38.4 | 5.2 | 33.2 |

EXAMPLE V

The procedures described in Example IV above were repeated except that the cross-linked hydroxyethyl cellulose used was the reaction product of paraformaldehyde and hydroxyethyl cellulose of Example I(B) above. Further, a cross-linked product, formed from the same reactants except that the ratio was 18 to 100, was used in the same manner. The results of all tests are given in Table II below.

TABLE II

Rheology and Fluid Loss Control
Hydroxy Aluminum - PF/HEC

| Sample No. | PF/HEC Ratio | HEC (%) | AlOOH (%) | n | K | TFL | Sp | CFL |
|---|---|---|---|---|---|---|---|---|
| 1 | 0.135 | 1.0 | 2.4 | 0.24 | 4.5 | 22.5 | 6.0 | 16.5 |
| 2* | 0.135 | 1.0 | 2.4 | 0.23 | 15.0 | 38.2 | 8.8 | 29.4 |
| 3** | 0.135 | 1.0 | 2.4 | 0.19 | 16.0 | 38.8 | 6.0 | 32.8 |
| 4 | 0.18 | 1.0 | 2.4 | 0.24 | 4.5 | 22.5 | 5.8 | 16.7 |
| 5* | 0.18 | 1.0 | 2.4 | 0.21 | 18.0 | 41.2 | 6.4 | 34.8 |
| 6** | 0.18 | 1.0 | 2.4 | 0.21 | 15.0 | 42.6 | 3.2 | 39.4 |

*Heated 16 hours at 121° C.
**Heated 16 hours at 121° C. and high shear

EXAMPLE VI

The procedure of Example V was repeated except that 7 parts of the hydroxy aluminum containing agent (2.1 percent AlOOH) was mixed with 3 parts of a PF/HEC cross-linked product which was formed as in Example I(B) except that the ratio of reactants was 8.9 to 100. The results given in Table III below show that the formed aqueous system has a combination of good fluid loss and pseudoplasticity.

TABLE III

| Sample No. | PF/HEC Ratio | HEC (%) | AlOOH (%) | n | K | TFL | Sp | CFL |
|---|---|---|---|---|---|---|---|---|
| 1 | 0.089 | 1.5 | 2.1 | 0.32 | 3.0 | 17.0 | 5.0 | 12.0 |
| 2* | 0.089 | 1.5 | 2.1 | 0.19 | 21.0 | 22.8 | 5.4 | 17.4 |
| 3** | 0.089 | 1.5 | 2.1 | 0.20 | 18.0 | 23.2 | 4.4 | 18.8 |

*Heated 16 hours at 121° C.
**Heated 16 hours at 121° C. and high shear

EXAMPLE VII

The procedure of Example IV was repeated except that 2.85 percent Glen Rose shale (GRS) was added to simulate rock cuttings. The results obtained indicate that the addition of rock cuttings have no adverse effect on the rheology and fluid loss control properties of the formed aqueous system.

TABLE IV

Glen Rose Shale Loaded Samples

| Sample No. | PF (g/g HEC) | HEC (%) | AlOOH (%) | GRS (%) | n | K | TFL | Sp | CFL |
|---|---|---|---|---|---|---|---|---|---|
| 1 | 0.135 | 0.97 | 2.3 | 2.85 | 0.21 | 5.4 | 22.5 | 6.0 | 16.5 |
| 2* | 0.135 | 0.97 | 2.3 | 2.85 | 0.15 | 40.0 | 38.2 | 6.4 | 31.8 |
| 3** | 0.135 | 0.97 | 2.3 | 2.85 | 0.15 | 32.0 | 37.2 | 4.4 | 32.8 |

*Heated 16 hours at 121° C.
**Heated 16 hours at 121° C. and high shear

EXAMPLE VIII

The procedures of Example IV were repeated except that epichlorohydrin cross-linked HEC was used. The cross-linked materials were formed in the manner described in Example I(C) with varying ratios of epichlorohydrin to HEC. In addition, a sample (Sample 4) was prepared from 1 part of cross-linked HEC, 3.5 parts AlO(OH) and 0.5 part water. The results of all samples are given below.

TABLE V

| Sample No. | ECH (ml/g HEC) | HEC (%) | AlOOH (%) | n | K | TFL | Sp | CFL |
|---|---|---|---|---|---|---|---|---|
| 1 A | 0.22 | 1.0 | 2.4 | 0.23 | 7.0 | 20.0 | 5.0 | 15.0 |
| B |  |  |  | 0.17 | 11.0 | 34.2 | 11.2 | 23.0 |
| C |  |  |  | 0.18 | 15.0 | 36.6 | 12.0 | 24.6 |
| 2 A | 0.33 | 1.0 | 2.4 | 0.21 | 9.6 | 16.0 | 2.8 | 13.2 |
| B |  |  |  | 0.18 | 14.0 | 37.2 | 17.6 | 19.6 |
| C |  |  |  | 0.19 | 12.0 | 33.2 | 13.2 | 20.0 |
| 3 A | 0.44 | 1.0 | 2.4 | 0.23 | 7.6 | 14.0 | 1.2 | 12.8 |
| B |  |  |  | 0.17 | 14.0 | 15.0 | 3.4 | 11.6 |
| C |  |  |  | 0.20 | 15.0 | 14.4 | 3.8 | 10.6 |
| 4 A | 0.44 | 1.0 | 2.1 | 0.26 | 4.7 | 14.5 | 1.6 | 12.9 |
| B |  |  |  | 0.19 | 13.0 | 14.0 | 2.4 | 11.6 |
| C |  |  |  | 0.19 | 14.0 | 13.4 | 1.4 | 12.0 |

A—As Made
B—16 Hrs at 121° C.
C—16 Hrs at 121° C. plus high shear
Each of the samples exhibited good pseudoplasticity and a high degree of fluid loss inhibition.

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A composition capable of imparting to aqueous systems a combination of pseudoplasticity and fluid loss control comprising a mixture of:

(a) a hydroxy containing aluminum component formed by mixing in an aqueous medium and under a high degree of agitation a water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product is capable of imparting to an aqueous medium a pH of from at least about 8 to about 10.3 in combination with (b) a cross-linked hyroxyalkyl cellulose reaction product, said reaction product formed by contacting in an aqueous medium a hydroxy $C_1$–$C_3$ alkyl cellulose and from about 0.1 to 200 percent of stoichiometry based on the hydroxy groups of the cellulose of an agent capable of cross-linking said cellulose, said agent being epihalohydrin or said agent being a compound having at least one aldehyde group therein or a compound capable of generating an aldehyde group in situ;

wherein the amount of component (a) to component (b) is in the ratio capable of directly forming an aqueous system having from about 0.5 to 10 weight percent of component (a) and from about 0.3 to 5 weight percent of component (b) based on the weight of the water of the system; the reaction between said hydroxyalkyl cellulose and ephihalohydrin being carried out in an aqueous basic medium having a pH of about 9.5 or more and the reaction between said hydroxyalkyl cellulose and said compound having or capable of generating at least one aldehyde group therein being carried out in an aqueous acidic medium having a pH of about 5.5 or less.

2. The composition of claim 1, wherein the component (a) is formed from an alkali metal aluminate with an acidic agent selected from the group consisting of an inorganic acid, aluminum chloride and aluminum nitrate, or their hydrates and component (b) is formed from the cross-linking agent selected from the group consisting of formaldehyde, acetaldehyde, propionaldehyde, glycolaldehyde, glyoxylic acid, glyoxal, paraformaldehyde, trimethylol melamine, hexamethylol melamine, tri($C_1$–$C_3$ alkoxymethyl) melamine or hexa($C_1$–$C_3$ alkoxymethyl) melamine in from about 1 to 50 percent of stoichiometry in an aqueous medium having a pH of less than about 5.5

3. The composition of claim 1, wherein the component (a) is formed from an alkali metal aluminate with an acidic agent selected from the group consisting of an inorganic acid, aluminum chloride and aluminum nitrate, or their hydrates and component (b) is formed from an epihalohydrin in from about 1 to 50 percent of stoichiometry in an aqueous media having a pH of at least about 9.5.

4. The composition of claim 2, wherein the component (a) is formed from an alkali metal hydroxide or ammonium hydroxide and an aluminum compound selected from the group consisting of aluminum chloride, aluminum nitrate and aluminum sulfate, their hydrates or mixtures thereof and component (b) is formed from 1 to 50 stoichiometric percent of an aldehyde agent.

5. The composition of claim 3 wherein the component (a) is formed from an alkali metal hydroxide or ammonium hydroxide and an aluminum compound selected from the group consisting of aluminum chloride, aluminum nitrate and aluminum sulfate, their hydrates or mixtures thereof and component (b) is formed from 1 to 50 stoichiometric percent of an epihalohydrin.

6. The composition of claim 2, wherein alkali metal aluminate is sodium aluminate, the acidic agent is aluminum chloride hexahydrate and the hydroxyalkyl cellulose is a water soluble material.

7. The composition of claim 3, wherein alkali metal aluminate is sodium aluminate, the acidic agent is aluminum chloride hexahydrate and the hydroxyalkyl cellulose is a water soluble material.

8. The composition of claim 2, wherein the hydroxyalkyl cellulose is hydroxyethyl cellulose.

9. The composition of claim 2, wherein the cross-linking agent is paraformaldehyde.

10. The composition of claim 3, wherein the cross-linking agent is epichlorohydrin.

11. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 1 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

12. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 2 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

13. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 3 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

14. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 4 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

15. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 5 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

16. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 6 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

17. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 7 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

18. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 8 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

19. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 9 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

20. In a water-based, clay-free drilling fluid suitable for circulating in a bore hole while drilling the bore hole into subterranean formations which includes, water, a weighting agent, a rheology enhancing agent and a fluid-loss controller, the improvement which comprises that said rheology enhancing agent and fluid-loss controlling agent are, in combination, the composition of claim 10 present in said fluid, the amount of component (a) of said composition is from about 0.5 to 10 weight percent and the amount of component (b) of said composition is from about 0.3 to 5 weight percent based on the weight of the water present in said fluid and said fluid is maintained at a pH of from 8 to 12.

21. In a process of drilling a bore hole into a subterranean formation using conventional bore hole drilling equipment, the improvement comprising circulating in the bore hole while drilling the drilling fluid of claim 11.

22. In a process of drilling a bore hole into a subterranean formation using conventional bore hole drilling equipment, the improvement comprising circulating in the bore hole while drilling the drilling fluid of claim 12.

23. In a process of drilling a bore hole into a subterranean formation using conventional bore hole drilling equipment, the improvement comprising circulating in the bore hole while drilling the drilling fluid of claim 13.

24. In a process of drilling a bore hole into a subterranean formation using conventional bore hole drilling equipment, the improvement comprising circulating in the bore hole while drilling the drilling fluid of claim 14.

25. In a process of drilling a bore hole into a subterranean formation using conventional bore hole drilling equipment, the improvement comprising circulating in the bore hole while drilling the drilling fluid of claim 15.

26. In a process of drilling a bore hole into a subterranean formation using conventional bore hole drilling equipment, the improvement comprising circulating in the bore hole while drilling the drilling fluid of claim 16.

27. In a process of drilling a bore hole into a subterranean formation using conventional bore hole drilling equipment, the improvement comprising circulating in the bore hole while drilling the drilling fluid of claim 17.

28. In a process of drilling a bore hole into a subterranean formation using conventional bore hole drilling equipment, the improvement comprising circulating in the bore hole while drilling the drilling fluid of claim 18.

29. In a process of drilling a bore hole into a subterranean formation using conventional bore hole drilling equipment, the improvement comprising circulating in the bore hole while drilling the drilling fluid of claim 19.

30. In a process of drilling a bore hole into a subterranean formation using conventional bore hole drilling equipment, the improvement comprising circulating in the bore hole while drilling the drilling fluid of claim 20.

* * * * *